July 9, 1968 J. K. A. OLSSON 3,392,376

RESISTANCE TYPE BINARY STORAGE MATRIX

Filed Sept. 1, 1965

INVENTOR.
JÖNS KURT ALVAR OLSSON

BY Haune and Hjeick

ATTORNEYS 3,392,376
RESISTANCE TYPE BINARY STORAGE MATRIX
Jöns Kurt Alvar Olsson, Tullinge, Sweden, assignor to Telefonaktiebolaget L M Ericsson, Stockholm, Sweden, a corporation of Sweden
Filed Sept. 1, 1965, Ser. No. 484,173
Claims priority, application Sweden, Sept. 18, 1964, 11,226/64
6 Claims. (Cl. 340—173)

ABSTRACT OF THE DISCLOSURE

There is disclosed a matrix type storage which includes a plurality of pairs of row conductors and a plurality of pairs of column conductors. At the crossovers of the conductors there are memory elements for connecting the row conductors to the column conductors. Four memory elements are associated with each crossover. The memory elements are voltage and current amplitude sensitive. Whenever the voltage across a memory element exceeds a striking voltage it is switchable between high and low ohmic states. The state it finally assumes is dependent on the magnitude of the current flowing through the element. A high current will cause it to settle in a high ohmic state while a lower current will cause it to settle in a low ohmic state. Writing is performed by selectively feeding voltage pulses to a selected pair of row conductors and a selector pair of column conductors. A read operation is performed by feeding current to a selected pair of column conductors and performing a parallel current sensing of all row conductors.

Figures 1, 2:
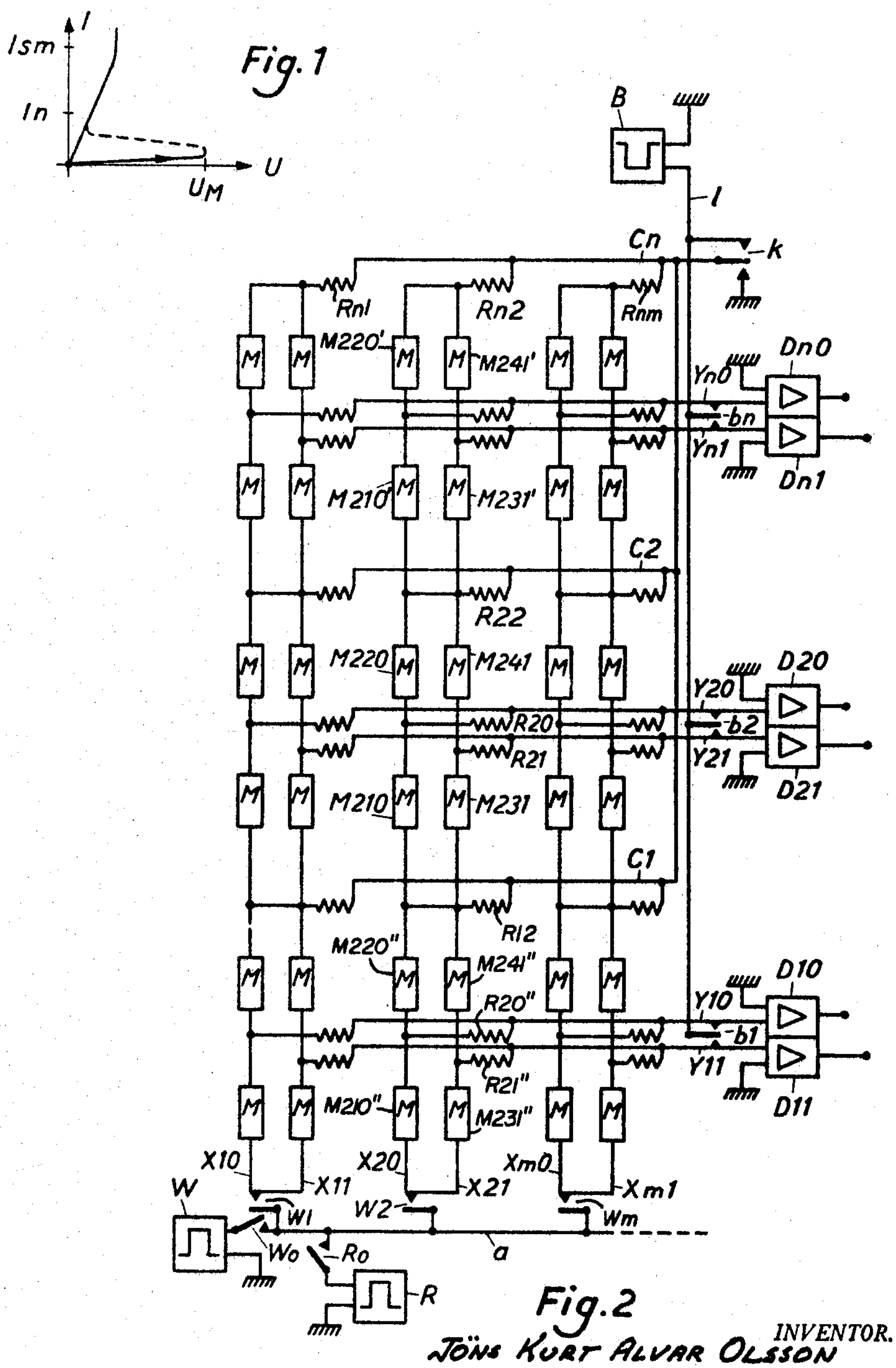

This invention pertains to apparatus for storing binary information (bits) and more particularly to coincidence signal type binary storage matrices.

One class of such matrices comprises first and second pluralities of signal conductors which cross or "intersect." Pulse signal sources connected to selected conductors of the pluralities cause the recording of bits where there is a coincidence of pulse signals at a conductor intersection. Reading is accomplished by connecting pulse sources to the first plurality of signal conductors and sensing devices to the second plurality of signal condnuctors. The pulse sources are energized and those sensing devices which are connected to signal conductors associated with intersections that are storing bits of information will detect a characteristic signal.

An object of the invention is to provide such a storage matrix which is not only highly reliable but also very easy to fabricate.

Another object of the invention is to provide such a storage matrix which is very compact and inexpensive.

Briefly, the invention contemplates a storage for binary information comprising a plurality of pairs of row conductors and a plurality of pairs of column conductors. The pairs of row conductors cross over the pairs of column conductors to define a plurality of regions of intersection. Associated with each region of intersection is a set of four memory elements. Each of the memory elements is a two-terminal, voltage and current dependent, bistable resistance means. A first two of each set of memory elements are connected serially and serially interposed in one of the column conductors defining the associated region of intersection. The remaining two of each set of memory elements are also serially connected and are serially interposed in the other of the column conductors. There are a plurality of pairs of resistors. Each of the pairs of resistors is associated with one of the sets of memory elements. One of the resistors of each pair is connected between the junction of the first two memory elements of the associated set and one of the row conductors of the associated pair. The other of the resistors of each pair is connected between the junction of the remaining two memory elements of the associated set and the other of the row conductors of the associated pair. A first pulse source for transmitting electrical signals of a first polarity is connected to a column bus while a plurality of column-selecting switch means, each associated with a pair of column conductors for selectively connecting the column bus to both column conductors of the associated pair is also present. There is a second pluse source for transmitting electrical signals of a second polarity which operates in synchronism with the first pulse source. The second pulse source is connected to a row bus. There are a plurality of row-selecting switch means, each associated with a pair of row conductors for at least selectively connecting the row bus alternatively in accordance with the value of the binary information to be stored to one of the row conductors of the associated pair of row conductors. A plurality of junction means, each of which is associated with one region of intersection, is provided for electrically connecting together a terminal of the memory element of the first two of the associated memory elements to a terminal of the corresponding memory element of the remaining two of the associated memory elements, the terminals being the ones remote from the serial junctions of the memory elements. Finally, junction connection means including resistance means are provided for connecting each of the junction means to the second pulse source.

Other objects, features and advantages of the invention will be further described in the following detailed specification when read with the accompanying drawings which show, by way of example and not limitation, a preferred embodiment of the invention.

In the drawings:

FIG. 1 shows the current-voltage characteristic of the memory elements contemplated by the invention; and FIG. 2 shows a schematic representation of the storage matrix in accordance with the invention.

Since the storage matrix utilizes a specific type of memory element this memory element will first be described by referring to FIG. 1. A typical memory element has the bistable property of changing from a high ohmic condition to a low ohmic condition when the voltage across it exceeds a striking or firing voltage $U_M$ and remains in the low ohmic condition when the current through it recedes to zero from a "normal value" $In$. But the memory element reverts to a high ohmic condition when the current through it recedes to zero from a value $Ism$, essentially exceeding the normal value $In$. Such memory elements are known in the art. It should be noted that these memory elements are bilateral and are only voltage and current amplitude sensitive regardless of the polarity of the applied voltage and current pulses.

Referring to FIG. 2, the storage matrix is shown comprising a first plurality of pairs of column conductors X10–X11, X20–X21, . . . , and X*m*0–X*m*1, and a second plurality of row conductors Y10–Y11, Y20–Y21, . . . , and Y*n*0–Y*n*1. The row conductors cross the column conductors to provide regions of intersection. There are a matrix of regions of intersection divided up into *m* columns and *n* rows. One end of each of the column conductors of each pair is joined to the corresponding end of its associated column conductor and this pair of ends is connected to the fixed contact of a switch. For example, the bottom ends of the column conductors X20 and X21 are connected to the fixed contact of the switch W2. The movable contacts of the switches W1, W2 and W*m* are connected to the bus *a*. The bus *a* is connected via switch W0 to the recording/ reading pulse source W and to the clearing pulse source R via the switch R0.

Each of the row conductors is connected to a current sensing device. For example, the conductor Y20 is connected to the input of the current sensing device D20 to indicate stored "0" bits; while the conductor Y21 is connected to the current sensing device D21 to sense for stored "I" bits. In addition, each of the row conductors is connected to the fixed contacts, respectively, of a single-pole double-throw switch. For example, the row conductor Y20 is connected to the upper contact of the switch *b*2 while the row conductor Y21 is connected to the lower fixed contact of the switch *b*2. Each of the switches *b* has its movable contact connected to the line *l*. A recording pulse generator B has its output connected to the line *l*.

The pulse source W can emit pulses having a voltage amplitude U greater than $\frac{1}{2}U_M$ but less than $U_M$. These pulses are positive going pulses. The pulse source B emits negative going pulses having an amplitude U similar to the amplitude U for the pulses from the source W. The pulse source R can emit pulses having an amplitude greater than the striking voltage $U_M$.

Now, associated with each region of intersection are four memory elements of the type described with respect to FIG. 1. For example, consider the region of intersection defined by the conductors X20–X21 and the conductors Y20–Y21. Associated with this region of intersection are the four memory elements M210, M220, M231 and M241. Pairs of the memory elements are connected in series in the row conductors. For example, the memory elements M210 and M220 are connected in series in the row conductor X20 while the memory elements M231 and M241 are connected in series in the row conductor X21. The junction of each of the memory elements of the serially connected pair is connected via a limiting resistor to one of the row conductors of the associated pair. For example, the junction of the memory elements M210 and M220 is connected via limiting resistor R20 to the row conductor Y20. Similarly, the junction of the memory elements M231 and M241 is connected via the current limiting resistor R21 to the row conductor Y21. The row conductor Y20 is associated with "0" bits and the row conductor Y21 is associated with "I" bits. The other ends of the memory elements M210 and M231 which are connected to the memory elements M220″ and M241″ of the next region of intersection are all connected in common via a resistor R12 to a conductor C1. Conductors C2 and C*n* are similarly connected via resistors such as resistor R*nm* to ends of the memory elements remote from the regions of intersection. Each of the conductors C1, C2, and C*n* are connected to the movable contact of a single-pole double-throw switch K having one fixed contact connected to ground and another fixed contact connected to the line *l*. With respect to the resistors, the following dimensions should be observed. Resistors such as R21 and R20, which connect the junction of the memory elements to the row conductors, all have the same magnitude. The resistors R12, R22 and R*n*2 should have a value less than the value of the resistors R20 and R21, but they should be sufficiently large to give rise to a current with an amplitude corresponding to the value I*n* as indicated in the characteristic of FIG. 1.

The operation of the storage matrix will now be described. First, assume that all the memory elements are in the high ohmic condition and all the switches are set, as shown in FIG. 2. As an example, the binary bits 010 will be set in the middle column of the matrix. To perform this recording it is necessary to close switches W0 and W2. This connects the middle column to the pulse source W. In addition, switch K is moved to the up position thus connecting the conductors C1, C2 and C*n* to the line *l*. Furthermore, the switches *bn* and *b*1 are moved to the up position while the switch *b*2 is moved to the down position as shown in FIG. 2. When there simultaneously occurs a positive pulse from the source W and a negative pulse from the source B the binary word will be recorded. In particular, the positive pulse from the source W travels through switch W0 and switch W2 and is applied to the bottom ends of the column conductors X20 and X21. Therefore, the ends of the memory elements M210″ and M231″ have a positive potential U. At the same time, the negative pulse from pulse source B travels along line *l* through switch K to the moving contacts of the switches *b*. The pulse passes through the moving contact of the switch *b*1 onto the line Y10. Therefore, a voltage with an amplitude of 2U is applied across the combination of memory element M210″ and resistor R20. This voltage is sufficient to cause the memory element M210″ to obtain the low ohmic condition. When this occurs the junction of memory elements M210″ and M220″ are effectively at the potential +U. It should be noted that the negative voltage pulse from the source B also passes through the switch K to the conductor C1. Therefore, when the memory element M210″ switches to the low ohmic condition, a potential having a magnitude of substantially 2U volts appears across the combination of memory element M220″ and resistor R12. This potential is sufficient to switch the memory element M220″ to the low ohmic condition. When this occurs the junction of the memory elements M220″, M210, M231 and M241″ are at a potential of substantially +U. Now, it should be noted that the negative voltage pulse from the source B also passes through switch *b*2 onto conductor Y21. Accordingly, there is a voltage with a magnitude of substantially 2U volts across the combination of memory element M231 and resistor R21. Therefore, memory element M231 switches to the low ohmic condition and when it does the potential at the junction of memory elements M231 and M241 becomes substantially +U volts. For the same reasons that the potential on conductor C1 is at −U volts the potential on the conductor C2 is at −U volts. Therefore, substantially 2U volts is impressed across the combination of memory element M241 and resistor R22. As a result, memory element M241 switches to the low ohmic condition. Accordingly, the junction of the memory elements M210′, M220, M231′ and M241 becomes substantially +U volts.

A similar analysis will show that the memory elements M210′ and M220′ switch to the low ohmic condition, it being realized that the switch *bn* is in the up position causing the voltage on the line Y*n*0 to be at substantially −U volts.

To summarize, it is seen that memory elements M210″, M220″, M231, M241, M210′ and M220′ are in the low ohmic condition. The remaining elements will still be in the high ohmic condition for the following reasons. When switch W2 is closed, the bottom end of memory element M231″ is at a potential of +U volts. However, the top end of the memory element M231″ is connected via resistor R21″ and conductor Y11 to the unconnected contact of switch *b*1. Therefore, at the most a voltage having a magnitude of U volts is impressed across memory element M231″. This is below the striking potential of the memory element and, therefore, it cannot change state. Similarly, although a potential of −U volts is present on conductor C1 causing the end of the memory element M241″ connected to the resistor R12 to be at a potential of −U volts before the memory element M210″ switches, the other end of memory M241″ is connected to the open contact of the switch *b*1. Therefore, at the most, a voltage having an amplitude of U volts is developed across memory element M241″. This is below the striking potential of the memory element. Furthermore, in spite of the fact that the potential at the bottom end of the memory element M231″ is +U volts and the potential on the conductor C1 is −U volts and that, therefore, there is a voltage having a magnitude of 2U volts across the serial combination of the memory elements M231″, M241″ and the resistor R12, each of the memory elements will only have a voltage of U volts developed across it. Hence, it can be reasonably assumed that the total potential will drop equally across each of the memory elements. It should also be noted that even after the memory elements M210″ and M220″ switch to the low ohmic condition there is in effect no voltage drop across the memory elements M241″ and M231″ and, therefore, they are unable to switch states. A similar analysis can be carried out for the memory elements M210, M220, M231′ and M241′.

In order to read the information stored in the middle column the following procedure is carried out. Switches W0 and W2 are again closed and switch *k* is moved from connection to the line *l* and is preferably grounded. A positive pulse from pulse source W passes through switch W0 and switch W2 to the inputs of conductors X20 and X21. Since memory element M231″ is still in the high ohmic condition, virtually no current passes therethrough. However, current passes through the low ohmic memory element M210″ and the resistor R20″ to the line Y10 where it is fed to the detector D10 yielding an output. In addition, a portion of the current flowing through memory element M210″ passes through memory element M220″ to the bottom ends of the memory elements M210 and M231. Since memory element M210 is in the high ohmic condition virtually no current passes therethrough. However, the current passes through the memory element M231 and the resistor R21 to the conductor Y21. This current feeds the detector D21 which produces an output. Some of the current passing through memory element M231 also flows through low ohmic state memory element M241 to the bottom ends of memory elements M210′ and M231′. Since memory element M210′ is in the low ohmic state, the current passes therethrough onto the line Y*n*0 and into the detector D*n*0. No current passes through memory element M231′ since it is in the high ohmic state. In this manner, the information stored in the middle column is read out and indicated by the signals on the detectors D10, D21 and D*n*0.

It should be noted that the value of the resistors associated with the column are so chosen that the resistance presented to the pulse source W requires that a voltage pulse is delivered which has an amplitude such that the total current has a value nearly corresponding to I*n* and is thus much smaller than the switch current I*sm* indicated in FIG. 1.

In order to erase the information stored in the middle column, it is necessary to open switch W0, close switch R0, close switch W2 and connect switch K to ground. Pulse source R will transmit a voltage pulse having a magnitude greater than the striking voltage $U_M$, so that all memory elements in the column will strike. In addition, it will deliver a current pulse having an amplitude greater than current magnitude I*sm* which will cause all of the memory elements in the column to switch to the high ohmic state.

While only one embodiment of the invention has been shown and described, it will be obvious to those skilled in the art that there are many modifications and variations satisfying many or all of the objects of the invention which do not depart from the spirit thereof as defined in the appended claims.

I claim:

1. A storage for binary information comprising: a plurality of pairs of row conductors; a plurality of pairs of column conductors; said pairs of row conductors intersecting said pairs of column conductors and defining a plurality of regions of intersection; a plurality of sets of four memory elements each associated with one region of intersection, each of said memory elements being a two-terminal, voltage and current dependent, bistable resistance means; a first two of each set of memory elements being serially connected and the serially connected memory elements being serially interposed in one of said column conductors defining the associated region of intersection, the remaining two of each set of memory elements being serially connected and the serially connected memory elements being serially interposed in the other of said column conductors; a plurality of pairs of resistors, each of said pairs of resistors being associated with one of the sets of memory elements, one of the resistors of each pair being connected between the junction of the first two memory elements of the associated set and one of the row conductors of the associated pair, the other of the resistors of each pair being connected between the junction of the remaining two memory elements of the associated set and the other of the row conductors of the associated pair; a first pulse source for transmitting electrical pulses of a first polarity; a column bus; means for connecting said first pulse source to said column bus; a plurality of column-selecting switch means, each associated with a pair of column conductors for selectively connecting said column bus to both column conductors of the associated pair of column conductors; a second pulse source for transmitting electrical pulses of a second polarity and operating in synchronism with said first pulse source; a row bus; means for connecting said second pulse source to said row bus; a plurality of row-selecting switch means each associated with a pair of row conductors for, at least, selectively connecting said row bus alternatively, in accordance with the value of the binary information, to one of the row conductors of the associated pair of row conductors, a plurality of junction means, each of said junction means being associated with one region of intersection for electrically connecting together a terminal of the memory element of said first two of the associated set of memory elements to a terminal of the corresponding memory element of the remaining two of the associated set of memory elements, said terminals being the ones remote from the serial junctions of the memory elements; and junction connection means including resistance means for connecting each of said junction means to said second pulse source.

2. The storage of claim 1, wherein each of said memory elements has one stable state of high resistance and another stable state of low resistance, each of said memory elements being triggered to said second stable state in response to a voltage having a magnitude greater than a given striking value, and being triggered from the second to the first stable state only at the end of a current pulse having a magnitude greater than a given reverting value.

3. The storage of claim 2, further comprising a third pulse source for generating current pulses having magnitudes greater than said reverting value and means for connecting said third pulse source to said column bus during the erasing of stored information and wherein said junction connection means includes means for connecting each of said junction means to said second pulse source during the writing of the binary information and to a neutral point during the erasing of stored information.

4. The storage of claim 2, further comprising signal-sensing means connected to each of said row conductors, a third pulse source for generating current pulses having magnitudes greater than said reverting value and means for connecting said third pulse source to said column bus during the erasing of stored information, and wherein said junction connection means includes means for connecting each of said junction means to said second pulse source during the writing of the binary information and to a neutral point during the reading or the erasing of the binary information and the switch means associated with each pair of row conductors includes means for disconnecting each of the row conductors simultaneously from said row bus during the reading or the erasing of the binary information.

5. The storage of claim 2, wherein both of said pulse sources generate pulses having voltage magnitudes less than said given striking value, but wherein the sum of their magnitudes is at least equal to said given striking value and having current magnitudes less than said given reverting value.

6. The storage of claim 5, further comprising signal-sensing means connected to each of said row conductors and wherein said junction-connecting means includes switching means for connecting said junction means to said second pulse source during the writing of the binary information and to a neutral point during the reading of the binary information, and the switch means associated with each pair of row conductors includes means for disconnecting each of the row conductors simultaneously from said row bus during the reading of the binary information.

References Cited

UNITED STATES PATENTS

| | | | |
|---|---|---|---|
| 3,027,464 | 3/1962 | Kosonocax | 307—88.5 |
| 3,109,945 | 11/1963 | Riley | 307—88.5 |
| 3,260,996 | 7/1966 | Müller | 340—166 |
| 3,294,986 | 12/1966 | Pleshko | 307—88.5 |

BERNARD KONICK, *Primary Examiner.*

J. F. BREIMAYER, *Assistant Examiner.*